US010013761B2

(12) United States Patent
Natroshvili et al.

(10) Patent No.: US 10,013,761 B2
(45) Date of Patent: Jul. 3, 2018

(54) AUTOMATIC ORIENTATION ESTIMATION OF CAMERA SYSTEM RELATIVE TO VEHICLE

(71) Applicant: Intel Corporation, Santa Clara, CA (US)

(72) Inventors: Koba Natroshvili, Waldbronn (DE); Kay-Ulrich Scholl, Karlsbad (DE)

(73) Assignee: Intel Corporation, Santa Clara, CA (US)

( * ) Notice: Subject to any disclaimer, the term of this patent is extended or adjusted under 35 U.S.C. 154(b) by 273 days.

(21) Appl. No.: 14/667,031

(22) Filed: Mar. 24, 2015

(65) Prior Publication Data

US 2016/0284087 A1    Sep. 29, 2016

(51) Int. Cl.
| *H04N 9/47* | (2006.01) |
| *G06T 7/00* | (2017.01) |
| *B60R 1/00* | (2006.01) |
| *G06T 7/80* | (2017.01) |
| *H04N 7/18* | (2006.01) |
| *H04N 5/225* | (2006.01) |

(52) U.S. Cl.
CPC .............. *G06T 7/0018* (2013.01); *B60R 1/00* (2013.01); *G06T 7/80* (2017.01); *B60R 2300/105* (2013.01); *B60R 2300/301* (2013.01); *B60R 2300/402* (2013.01); *G06T 2207/10016* (2013.01); *G06T 2207/30252* (2013.01)

(58) Field of Classification Search
CPC ............. H04N 9/47; H04N 7/18; H04N 5/225
USPC .......................................... 348/148, 169, 61
See application file for complete search history.

(56) References Cited

U.S. PATENT DOCUMENTS

| 9,319,667 B2* | 4/2016 | Lin ..................... H04N 17/002 |
| 2001/0012985 A1* | 8/2001 | Okamoto ................. G06T 7/80 |
| | | 702/94 |
| 2006/0029255 A1* | 2/2006 | Ozaki ....................... B60R 1/00 |
| | | 382/104 |
| 2007/0290886 A1* | 12/2007 | Stam ........................ B60Q 9/00 |
| | | 340/907 |
| 2012/0320190 A1 | 12/2012 | Natroshvili et al. |
| 2014/0247354 A1* | 9/2014 | Knudsen .................. B60R 1/00 |
| | | 348/148 |

\* cited by examiner

*Primary Examiner* — Daquan Zhao (74) *Attorney, Agent, or Firm* — Jordan IP Law, LLC (57) ABSTRACT

Methods, apparatuses, and systems may provide for using the motion of a vehicle to estimate the orientation of a camera system of a vehicle relative to the vehicle. Image data may be received from a plurality of cameras positioned on the vehicle, and a first constraint set may be determined for the plurality of cameras based on a plurality of feature points in a ground plane proximate to the vehicle. A second constraint set may be determined based on one or more borders of the vehicle. One or more of the cameras may be automatically calibrated based on the first constraint set and the second constraint set.

21 Claims, 10 Drawing Sheets

AUTOMATIC ORIENTATION ESTIMATION OF CAMERA SYSTEM RELATIVE TO VEHICLE

BACKGROUND

Technical Field

Embodiments generally relate to vehicle camera surround systems. More particularly, embodiments relate to the automatic calibration of the camera-based driver assistance system of a vehicle relative to the vehicle.

Discussion

In recent years, the use of rear, side and front view cameras in vehicles has increased. These cameras may be used to assist drivers while the vehicle is being parked, and may also be used to assist drivers while the vehicle is in motion, to observe the surrounding areas of the vehicle. In order to make maximum usage of the cameras mounted on a vehicle, calibration of the camera system may be conducted.

In addition to the location and orientation of each camera relative to each other, the orientation and location of the cameras relative to the vehicle may also be determined. Usually, such camera-based systems may be calibrated at the end of a production line during the manufacture of the vehicle by using external markings on the ground. Such approach, however, may involve placement of the vehicle very accurately relative to the external markers during calibration. Additionally, the calibration may need to be repeated frequently over time in order to assure the correct results of applications using the camera system.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION OF EXEMPLARY EMBODIMENTS

Figure 1:
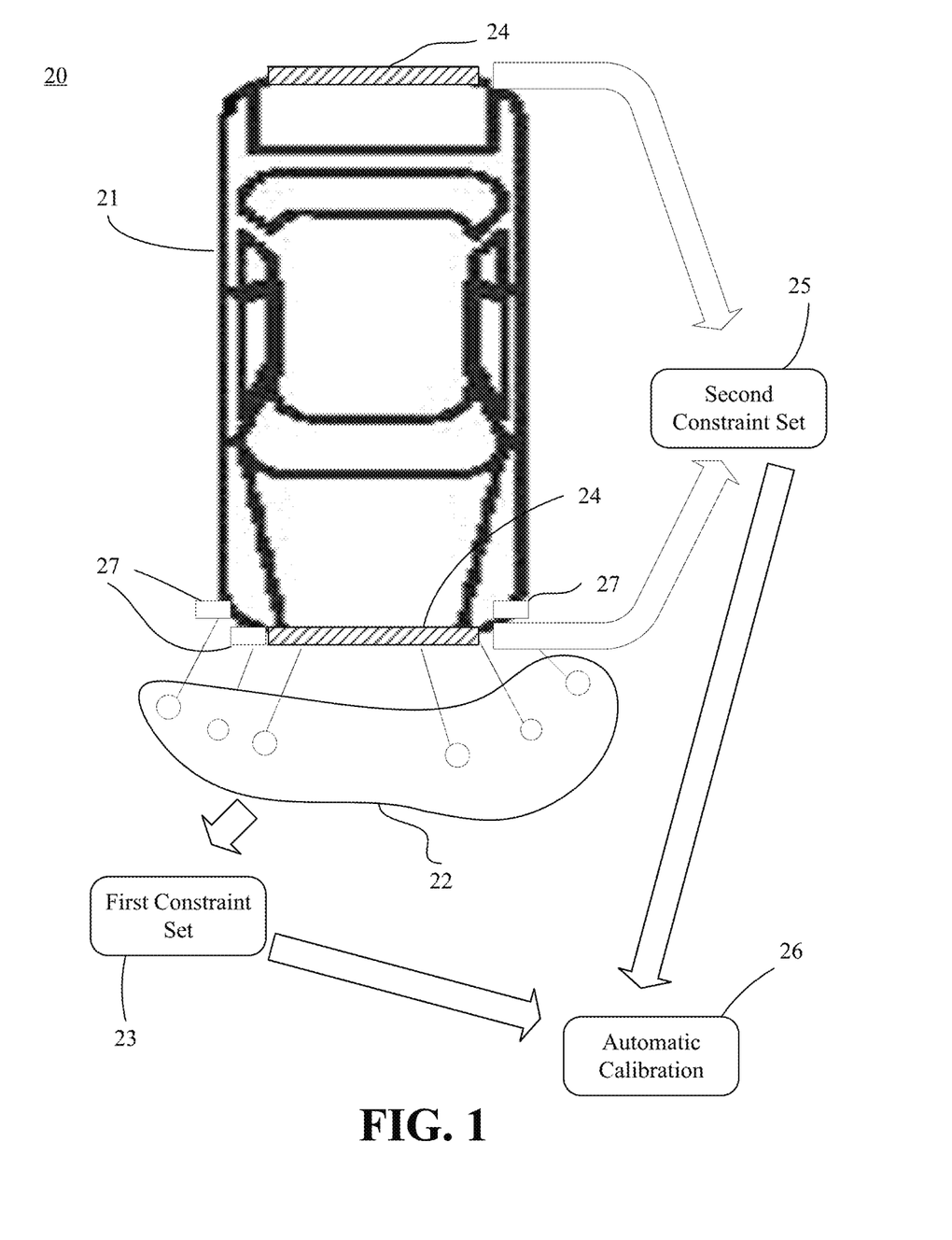
FIG. 1 is an illustration of an example of an automatic calibration according to an embodiment.

FIG. 1 is a schematic view illustrating an exemplary camera-based driver-assistance system 20. In vehicular surround view systems, data captured by a plurality of image sensors (for example, cameras with fisheye lenses) may be combined to enable a user to easily view the surrounding environment. The image sensors of the camera-based driver-assistance system 20 may be provided on various locations on or within a vehicle hosting the camera-based driver-assistance system 20. Calibration operations may be performed to establish extrinsic and intrinsic parameters for each of the cameras of the camera-based driver-assistance system 20. The camera-based driver-assistance system 20 may include a plurality of cameras 27. The cameras 27 may be wide angle cameras, but are not limited thereto. Each of the cameras may include a fisheye lens, and may each include a charge-coupled device (CCD) sensor. The electro-optical sensors of the cameras may be coupled to an image processing module (not shown) of the camera-based driver-assistance system 20. While the illustrated system 20 may be used to provide driver-assistance, other types of camera-based systems such as, for example, vehicle security systems may also use the automatic calibration techniques described herein.

The camera-based driver-assistance system 20 may be a surround view system mounted to a vehicle 21. Accordingly, the field of view (FOV) of the cameras 27 may cover a 360° angular range around the vehicle 21. The cameras 27 may be installed at the front, rear, and sides of the vehicle 21. Cameras 27 that are installed at the front of the vehicle 21 may have a FOV extending to the front of the vehicle 21. Likewise, cameras 27 that are installed at the rear of the vehicle 21 may have a FOV extending to the rear of the vehicle 21. Cameras 27 that are installed at the sides of the vehicle may have a FOV extending to the sides of the vehicle 21. The cameras 27 that are installed at the sides of the vehicle 21 may be installed on the side view mirrors (not shown) of the vehicle 21. If the side view mirrors are movable, the cameras 27 may then be installed at a non-movable portion of the body of the side view mirror.

The image processing module (not shown) of the camera-based driver-assistance system 20 may receive the image data generated by the cameras 27 and determine both extrinsic and intrinsic parameters of the cameras 27 by using calibration logic (the logic may include hardware, software, firmware, or a combination thereof). Intrinsic parameters may include parameters and models for wide-angle cameras that define the non-linear distortion of the captured images, such as focal length, principal point, etc. The processing module (not shown) may store and subsequently retrieve the intrinsic parameters when merging captured images in order to correct for non-linear distortions in captured images. The extrinsic parameters of the vehicle orientation system may include information on the position and orientation of cameras.

According to an aspect of the exemplary embodiment, the cameras 27 of the camera-based driver-assistance system 20 identify feature points 22 that are near the vehicle 21, and estimate locations and orientations of the feature points relative to the cameras 27. On the basis of the estimation of the feature points 22 a first constraint set 23 for extrinsic camera parameters may be defined. The feature points 22 may be non-stationary points, and may be located on the ground plane relative to the vehicle 21.

Additionally, one or more borders 24 of the vehicle 21 may be detected and matched to known geometric parameters of the vehicle 21 itself. The borders 24 of the vehicle 21 may be used to determine a second constraint set 25. With the additional second constraint set 25, all necessary extrinsic parameters may be determined. The two-dimensional (2D) motion of the vehicle 21 may be estimated, and thus the camera parameters may be deduced.

Accordingly, in the exemplary embodiments, the calibration of the cameras 27 does not utilize any fixed external environmental calibration markings or patterns. The parameters are obtained simply by moving the vehicle. A discussion will now be made with regard to the determination of the first constraint set 23.

Assume that the relative orientation of the cameras 27 to each other is known. If $R_{VCam1}$ is the relative orientation of a first camera (Camera 1) of the plurality of cameras 27 of the vehicle, and $R_{VCam1}$ is detected, then the orientations of each camera relative to the vehicle would be known.

However, since this approach can be applied to all of the cameras 27, the precision of the obtained parameters can even be increased by making use of a least square error approach and combining all of the measurements.

All of the feature points 22 may be positioned on a ground plane at locations proximate to the vehicle 21. Structure from Motion (SFM) algorithms may be used to estimate the angles and locations of the feature points relative to the camera coordinate system of the camera-based driver-assistance system. For example, assume that from a first camera (Camera 1) n feature points have been estimated on the ground plane with coordinates $$X_{gCam1} = \begin{pmatrix} x_{gCam1} \\ y_{gCam1} \\ z_{gCam1} \end{pmatrix}.$$

These coordinate points are converted into vehicle coordinates:

$$\begin{bmatrix} R_{VCam1}, F_{VCam1} \\ 0, 0, 0, 1 \end{bmatrix} \cdot \begin{pmatrix} x_{gCam1}(nCam1) \\ y_{gCam1}(nCam1) \\ z_{gCam1}(nCam1) \\ 1 \end{pmatrix} S_{Cam1} = \begin{pmatrix} x_{VCam1}(nCam1) \\ y_{VCam1}(nCam1) \\ z_{VCam1}(nCam1) \\ 1 \end{pmatrix} \quad (1)$$

where $F_{VCam1}$ is the translation vector between Camera1 and the vehicle coordinate system and $x_{VCam1}$ is the coordinate of the points in vehicle coordinates. All of these points may be on the ground plane, therefore the Z coordinate in the vehicle coordinates will be zero: $z_{VCam1}(n)=0$. The same relations are valid for a second camera:

$$\begin{bmatrix} R_{VCam2}, F_{VCam2} \\ 0, 0, 0, 1 \end{bmatrix} \cdot \begin{pmatrix} x_{gCam2}(nCam2) \\ y_{gCam2}(nCam2) \\ z_{gCam2}(nCam2) \\ 1 \end{pmatrix} S_{Cam2} = \begin{pmatrix} x_{VCam2}(nCam2) \\ y_{VCam2}(nCam2) \\ z_{VCam2}(nCam2) \\ 1 \end{pmatrix} \quad (2)$$

with $R_{VCam1}$ as the rotation matrix of the camera 2 relative to the vehicle coordinate system. Using the relative orientation and translation between camera 1 and camera 2 this results in the following relation:

$$\begin{bmatrix} R_{VCam1} \cdot R_{Cam1Cam2}, T_{VCam1} + R_{VCam1} \cdot T_{Cam1Cam2} \\ 0, 0, 0, 1 \end{bmatrix} \cdot \begin{pmatrix} x_{gCam2}(nCam2) \\ y_{gCam2}(nCam2) \\ z_{gCam2}(nCam2) \\ 1 \end{pmatrix} \quad (3)$$

$$S_{Cam2} = \begin{pmatrix} x_{VCam2}(nCam2) \\ y_{VCam2}(nCam2) \\ z_{VCam2}(nCam2) \\ 1 \end{pmatrix}$$

With these constraints given by equations (2) and (3) and considering that all points may be in one flat plane (z=0!) the calculation of the matrix $$R_{VCam1} = \begin{pmatrix} R_{VCam1\_11} & R_{VCam1\_12} & R_{VCam1\_13} \\ R_{VCam1\_21} & R_{VCam1\_22} & R_{VCam1\_23} \\ R_{VCam1\_31} & R_{VCam1\_32} & R_{VCam1\_33} \end{pmatrix}$$

can be significantly simplified by focusing only on the last row: $R_{VCam1\_31}$, $R_{VCam1\_32}$, $R_{VCam1\_33}$.

By knowing $R_{VCam1\_31}$, $R_{VCam1\_32}$, $R_{VCam1\_33}$, we still do not know the complete matrix. The reason is that $R_{VCam1}$ is orthonormal and the following relation is valid:

$$R_{VCam1\_31}^2 + R_{VCam1\_32}^2 + R_{VCam1\_33}^2 = 1 \quad (4)$$

A manner of obtaining the second constraint set will now be discussed with regard to FIG. 9.

Figure 9:
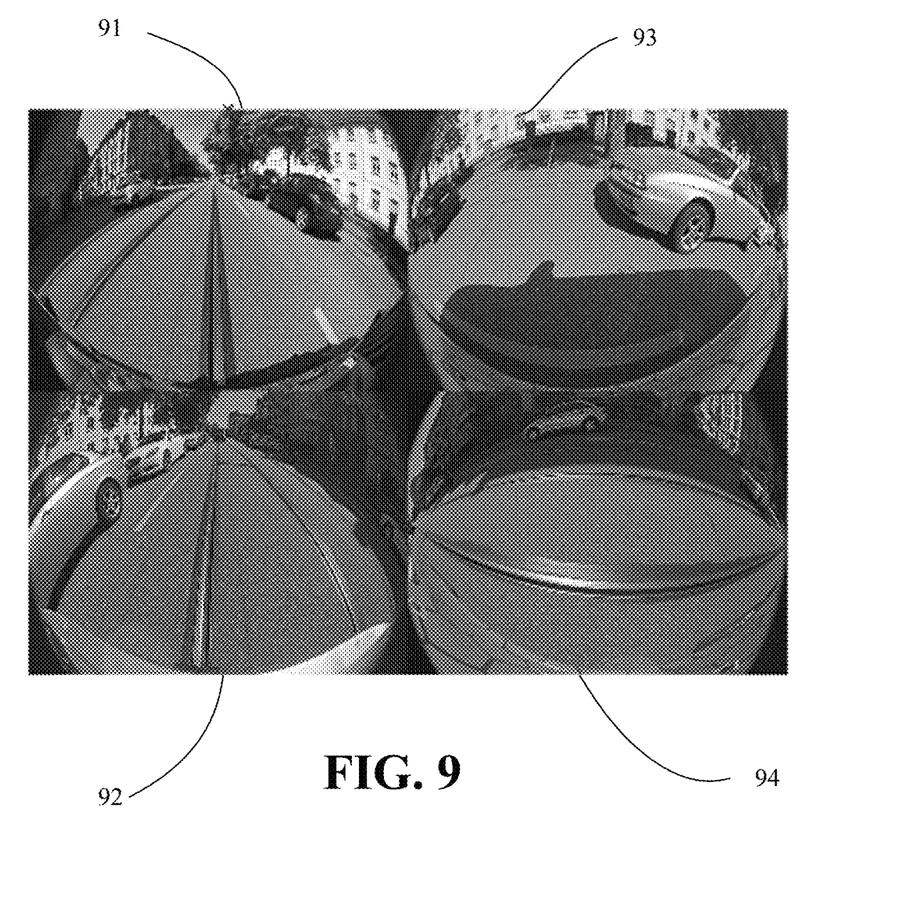
FIG. 9 is an illustration of an example of fish-eye images captured by cameras of a camera-based driver-assistance system according to an embodiment.

With continuing reference to FIGS. 1 and 9, four images 91, 92, 93 and 94 may be obtained from at least four of the plurality of cameras. The plurality of cameras may include fish eye lenses. The cameras may be mounted on a vehicle 21, and may point in four different directions. The additional second constraint set 25 may fix the camera system relative to the vehicle 21. Utilizing the fish eye lensed cameras 27 may result in borders such as, for example, the borders 24 of the vehicle 21 being captured along with the external image. The borders 24 that are visible in the captured image may be used to generate the additional second constraint set 25. The borders 24 may be detected by the optical flow of the frames of the image, or by other image processing algorithms.

Figure 8A:
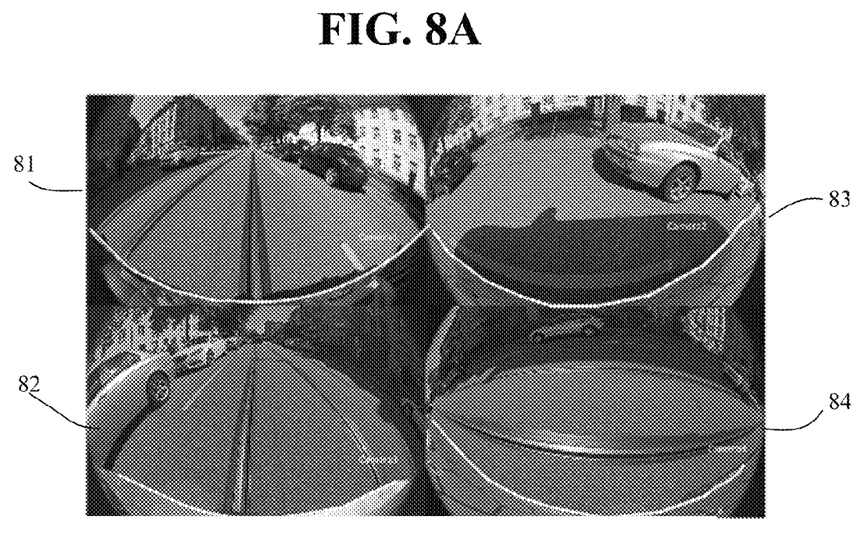
FIG. 8A is a an illustration of an example of borders of images from cameras of a camera-based driver-assistance system according to an embodiment.

Specifically, during the processing of a plurality of image frames in the image data, a plurality of sequential frames may be tracked, and an image that is detected as being constant in the plurality of frames may be determined to be a border 24 of the vehicle 21. FIG. 8A illustrates an estimation of the borders 81, 82, 83, and 84 in the four images 91, 92, 93 and 94, respectively, that were captured by fish eye lensed cameras 27.

Figure 8B:
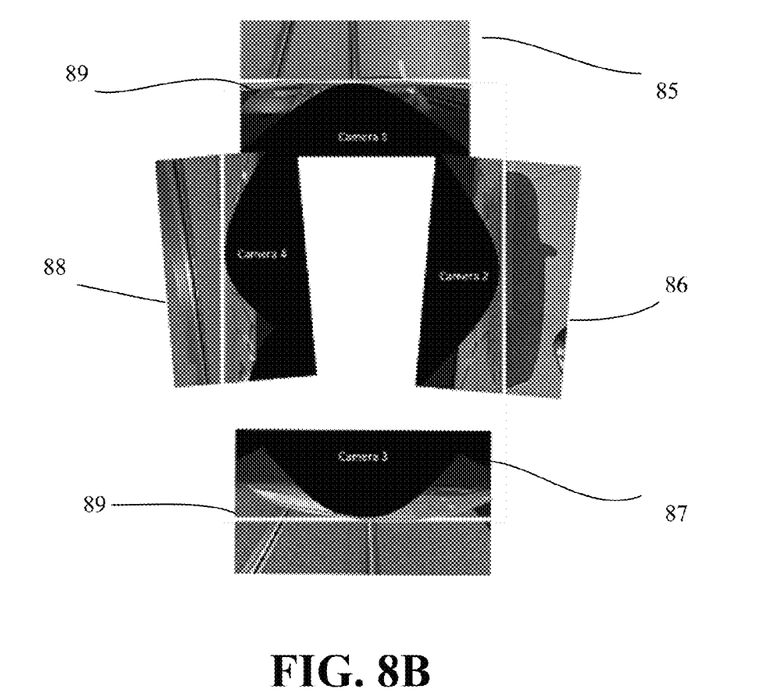
FIG. 8B is an illustration of an example of a projection of an image on a ground plane according to an embodiment.

FIG. 8B illustrates the projection of the cameras on the ground plane. In the illustrated case, only four cameras—a first camera 85 ("Camera 1"), a second camera 86 ("Camera 2"), a third camera 87 ("Camera 3"), and a third camera 88 ("Camera 4"), are shown. The use of four cameras, however, is only exemplary, and any number of cameras may be used.

In FIGS. 8A and 8B, the exemplary embodiment is only utilizing the borders of the front and rear cameras attached to the vehicle 21, wherein the border lines are projected onto the ground plane. For the projection of the rear camera, the relative orientation of the third camera 87 may be determined by the relation: $R_{VCam3}=R_{VCam1} \cdot R_{Cam1Cam3}$, where $R_{Cam1Cam3}$ is known and again $R_{VCam1}$ is the unknown. As shown in FIG. 8B, after the projection, the projected curves of the vehicle front and rear borders are shown as curve 89 (e.g., corresponding to the borders 24 illustrated in FIG. 1). This type of geometrical property may be used in the optimization of the extrinsic parameters. For the border points obtained from the images, the projection from the ground plane is performed in the following manner.

Each pixel may be projected onto the unit sphere. This projection can be easily done when the fisheye camera intrinsic calibration parameters are known. The intersection of a line connected to the front of the camera center and points on the unit sphere with the ground plane may be determined. In the vehicle coordinates, the camera center will have the coordinate $F_{vCam1}$. The point on the unit sphere may be changed by the equation:

$$\begin{bmatrix} R_{VCam1}, F_{VCam1} \\ 0,0,0,1 \end{bmatrix} \cdot \begin{pmatrix} x_{borderUnitsphereCam1}(n) \\ y_{borderUnitsphereCam1}(n) \\ z_{borderUnitsphereCam1}(n) \\ 1 \end{pmatrix} = \begin{pmatrix} x_{borderVehicleCam1}(n) \\ y_{borderVehicleCam1}(n) \\ z_{borderVehicleCam1}(n) \\ 1 \end{pmatrix} \quad (5)$$

In Equation (5), $$\begin{pmatrix} x_{borderUnitsphereCam1}(n) \\ y_{borderUnitsphereCam1}(n) \\ z_{borderUnitsphereCam1}(n) \\ 1 \end{pmatrix}$$

is the point on the unit sphere and $$\begin{pmatrix} x_{borderVehicleCam1}(n) \\ y_{borderVehicleCam1}(n) \\ z_{borderVehicleCam1}(n) \\ 1 \end{pmatrix}$$

is the coordinates of the same point in the vehicle coordinate system. In this manner, each line in the vehicle coordinates is projected, and the intersection of these lines is calculated with the ground plane $$\begin{pmatrix} x_{borderGroundCam1}(n) \\ y_{borderGroundCam1}(n) \\ z_{borderGroundCam1}(n)=0 \end{pmatrix}.$$

Figure 2:
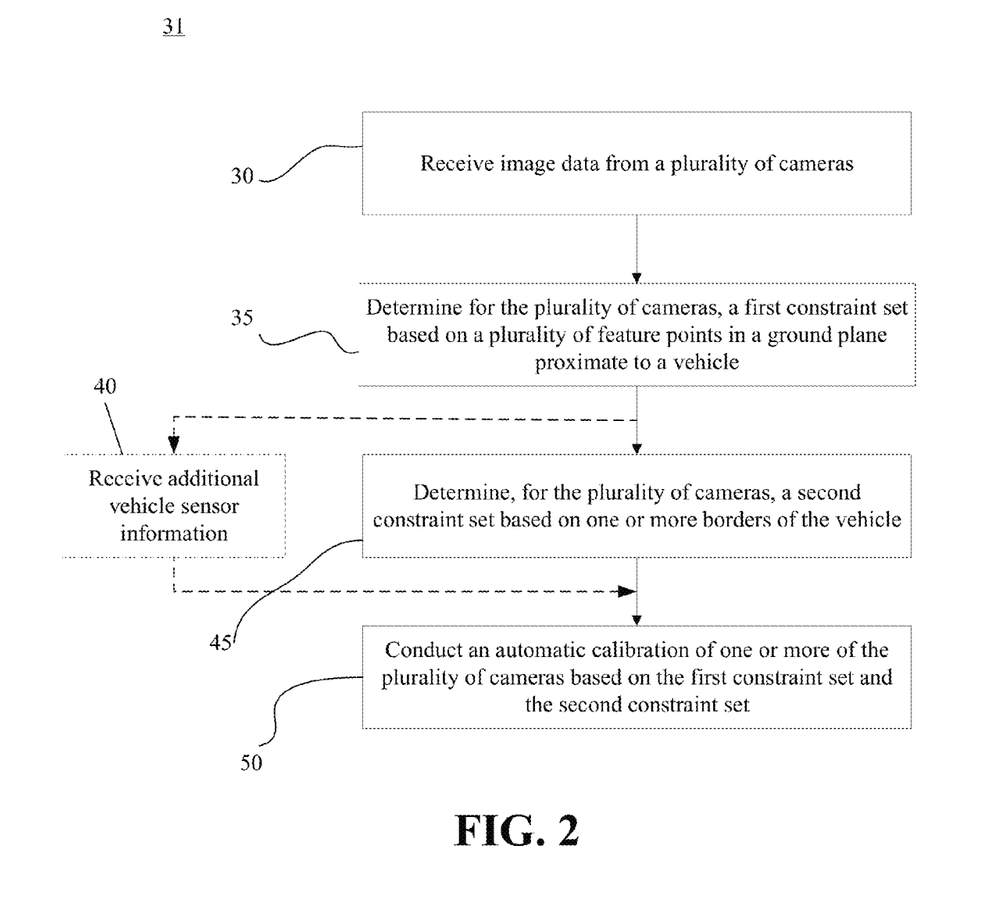
FIG. 2 is a flow chart of an example method of calibrating a camera-based driver-assistance system according to an embodiment.

FIG. 2 is a flow chart illustrating a method 31 of automatically calibrating a camera-based driver-assistance system according to an exemplary embodiment. The method 31 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 31 may be written in any combination of one or more programming languages, including an object oriented programming language such as C#, JAVA or the like.

In illustrated processing block 30, image data that is captured by a plurality of cameras positioned on a vehicle are received by an image processing module (not shown) of the camera-based driver-assistance system. A first constraint set may be determined for the plurality of cameras in block 35. The first constraint set may be determined based on a plurality of feature points in a ground plane proximate to the vehicle.

At this point, a second constraint set is determined. The second constraint set may be determined in multiple different manners. As shown in block 45, the second constraint set may be determined for the plurality of cameras on the basis of one or more borders of the vehicle. The front and rear edges of the vehicle may be detected and projected to the ground plane, wherein geometrical properties of the projected curves may be used as the second constraint set.

Alternately, in block 40, the second constraint set may be determined based on vehicular sensor information obtained from vehicle sensors. The vehicle sensors may include, but are not limited to, laser scanners, and radar scanners. In yet another example, both the sensor information from block 40 and the borders of the vehicle from block 45 may be used in combination to determine the second constraint set.

Figure 3:
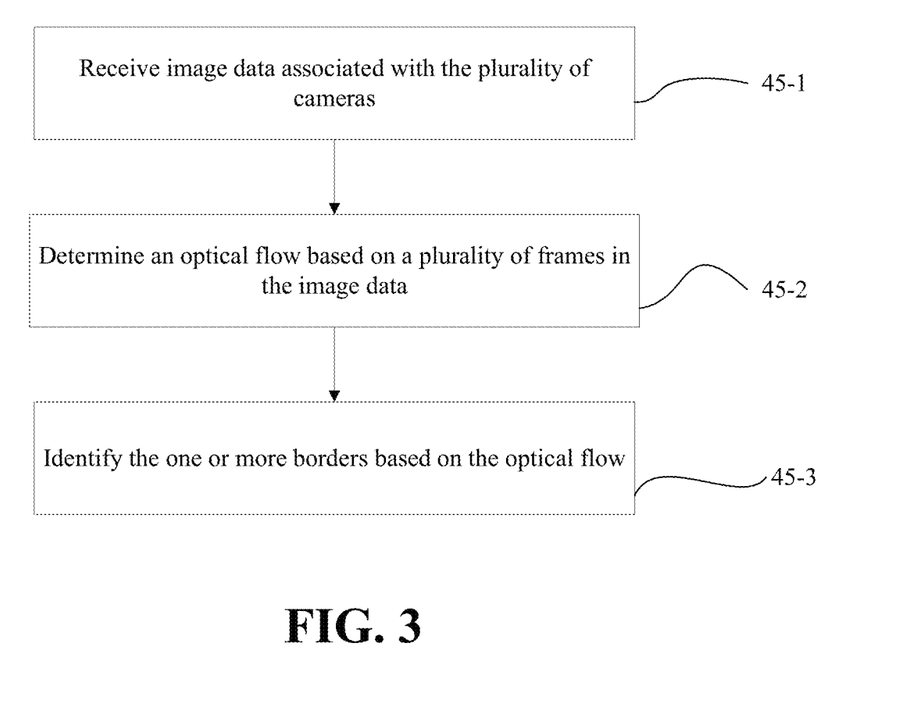
FIG. 3 is a flow chart of an example method of determining a second constraint set performed by a camera-based driver-assistance system according to an embodiment.

One or more of the plurality of cameras are then calibrated based on the determined first constraint set and the determined second constraint set in illustrated block 50. FIG. 3 more clearly illustrates in manner in which the second constraint set is determined.

As illustrated in block 45-1 of FIG. 3, image data captured by the plurality of cameras, and associated with a field of view of each of the plurality of cameras, is received by an image processing module (not shown) of the camera-based driver-assistance system. A sequential set of frames of the received image data may be examined in block 45-2, and a determination may be made whether a consistent image is present in the sequence of frames. The consistent image may then be identified as one or more borders based on the optical flow of the sequential frames in block 45-3.

Figure 4:
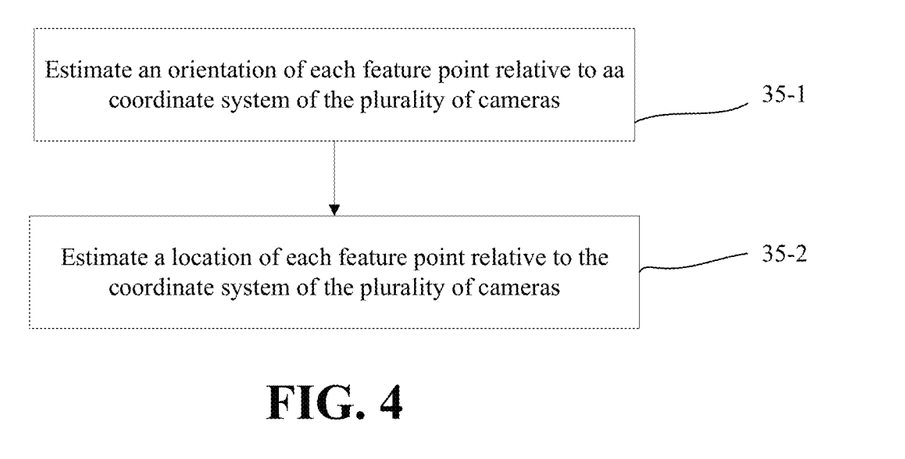
FIG. 4 is a flow chart of an example method of determining a first constraint set performed by a camera-based driver-assistance system according to an embodiment.

FIG. 4 is a flow chart illustrating a manner in which the first constraint set may be determined. Image data captured by the plurality of cameras may be received by an image processing module (not shown), wherein an orientation of each feature point relative to a coordinate system of the plurality of cameras is estimated at illustrated block 35-1. Additionally, a location of each feature point relative to the coordinate system of the cameras may be estimated at block 35-2. The first constraint set may then be determined based on the estimated orientation and location of the feature points.

Figure 5:
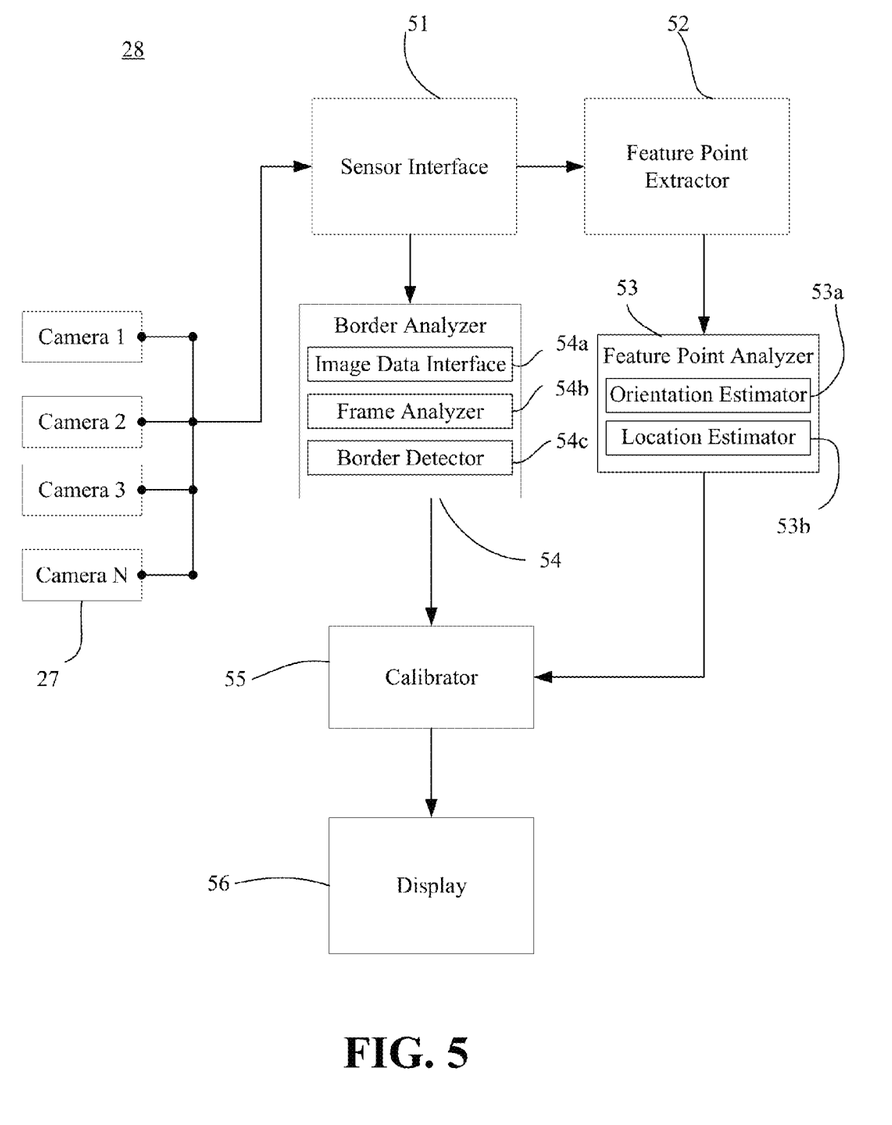
FIG. 5 is a block diagram of an example a camera-based driver-assistance system according to an embodiment.

With reference to FIG. 5, a camera-based driver-assistance system 28 is shown. The system 28 includes the plurality of cameras 27, each comprising electro-optical components to capture images of the proximate environment of a vehicle (not shown). The cameras may be located in different positions of the vehicle, which hosts the camera-based driver-assistance system. The images that are captured by the plurality of cameras are transmitted to a sensor interface 51 of the camera-based driver-assistance system. In addition to receiving the images captured by the plurality of cameras, the sensor interface 51 may also receive additional sensor data from one or more sensors positioned on the vehicle. The information received by the sensor interface 51 may be transmitted to a feature point extractor 52 and a border analyzer 54 (54a-54c).

The illustrated feature point extractor 52 receives image data associated with the plurality of cameras 27, and detects the plurality of feature points based on the received image data. The extracted feature points may be transmitted to a feature point analyzer 53 (53a-53b), which determines, for the plurality of cameras 27, a first constraint set 23 (FIG. 1) based on the plurality of feature points 22 (FIG. 1). The feature point analyzer 53 may include an orientation estimator 53a that estimates an orientation of each feature point relative to a coordinate system of the plurality of cameras 27. The feature point analyzer 53 may also include a location estimator 53b that estimates a location of each feature point relative to the coordinate system of the plurality of cameras 27.

The illustrated border analyzer 54 determines, for the plurality of cameras 27, a second constraint set based on one or more borders of the vehicle. The border analyzer 54 may also determine the second constraint set based on the additional vehicular sensor data. The additional vehicular sensor may include one or more of velocity data, steering angle data, wheel information, and inertia data. The additional vehicular sensor data is not so limited, however, and other types of vehicular sensor may be obtained.

The border analyzer 54 may also include an image data interface 54a to receive data associated with the plurality of cameras and transmitted from the sensor interface 51, a frame analyzer 54b, which determines an optical flow based on a plurality of sequential frames in the image data. The border analyzer 54 may also include a border detector 54c to determine one or more borders based on the optical flow of the image data. Specifically, the illustrated border detector 54c analyzes a number of sequential image frames captured by the plurality of cameras, and an image which is constant in the plurality of sequential image frames to be an image of the border of the vehicle 21.

A calibrator 55 may receive the first constraint set and the second constraint set, and automatically calibrate one or more of the plurality of cameras based on the first constraint set and the second constraint set. A display 56 may visually output a result of the automatic calibration.

Figure 6:
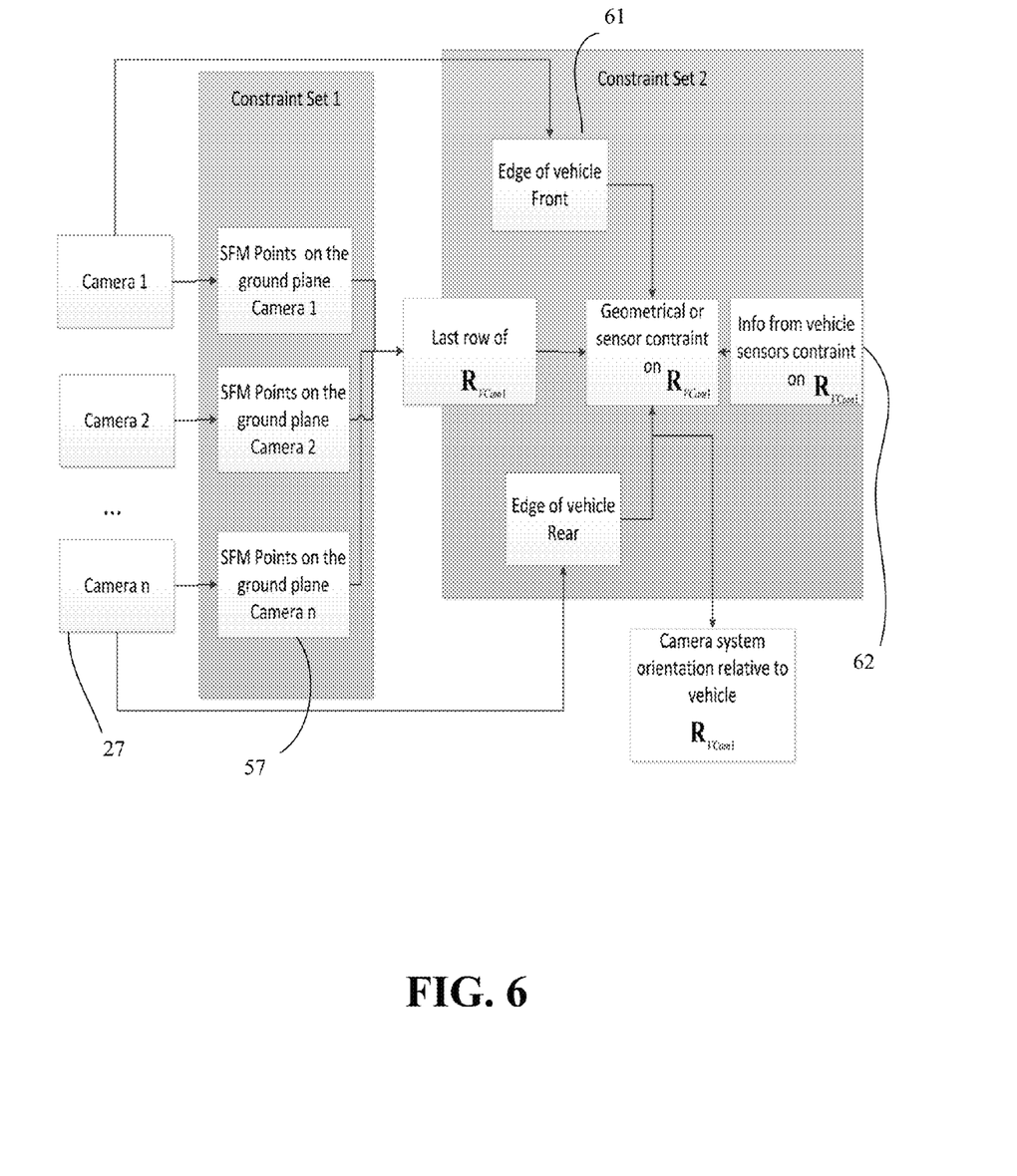
FIG. 6 is a block diagram of an example system of a constraint set generation architecture.

Turning now to FIG. 6, another illustration of a constraint set generation architecture is shown. As shown in FIG. 6, Structure from Motion (SFM) algorithms 57 are used to estimate the angles (orientations) and locations of the feature points on the ground plane relative to the camera coordinate system, thus generating the first constraint set. As illustrated in FIG. 6, the second constraint set may be determined from edge (border) images 61 received from the plurality of cameras 27, or alternately, from vehicular sensor information 62, received directly from the vehicle 21.

Figure 7:
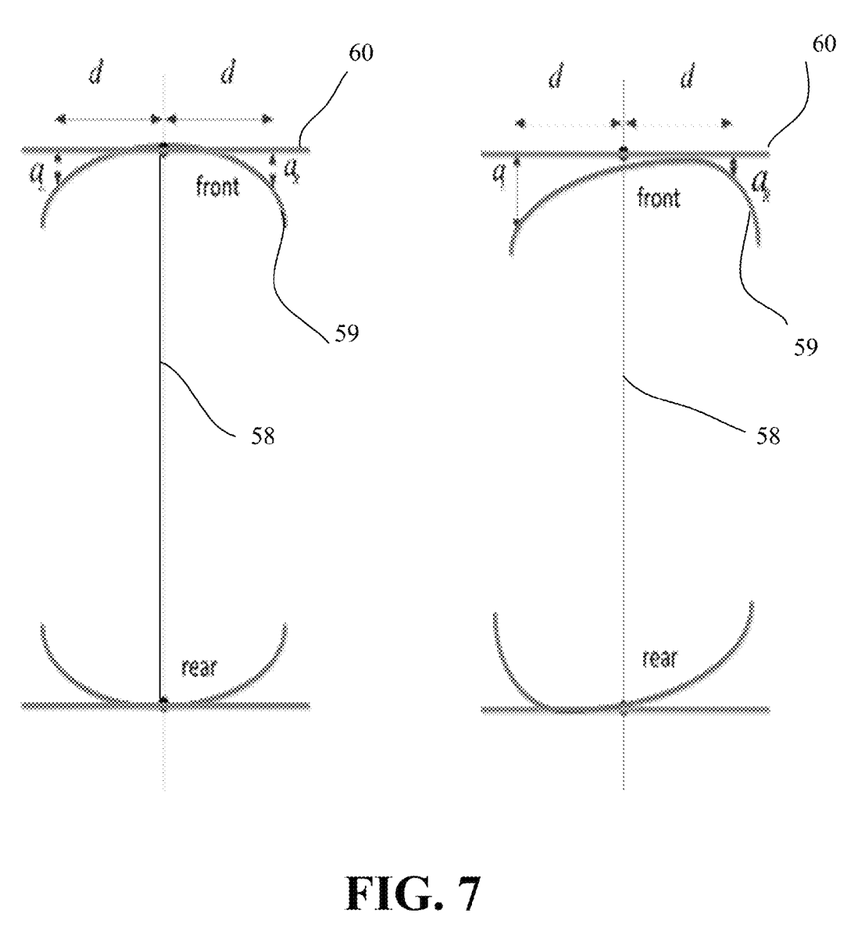
FIG. 7 is a an illustration of an example of an idealistic representation of projected vehicle edges according to an embodiment.

Turning now to FIG. 7, line 59 is representative of a border line identified in an image signal captured by one of the plurality of cameras 27. Line 58 is representative of a line in the center of the vehicle 21, and line 60 is perpendicular to the line 58. The detected vehicle borders from the image data are projected on the ground plane. The curves of the borders of the vehicle do not literally lay in the reality on the ground plane, but the projection is still done on the ground plane, since the border curve and the ground plane will be parallel. FIG. 7 illustrates an embodiment after the projection of the detected vehicle borders. The left image in FIG. 7 corresponds to an embodiment when the camera extrinsic parameters are correct, and the right image in FIG. 7 corresponds to an embodiment when the estimated camera extrinsic parameters are incorrect. The camera RVCam1 (the front camera orientation relative to vehicle) is optimized to achieve the representation given in the left image in FIG. 7. The constraint used to determine whether the representation in the left image of FIG. 7 is reached may be Equation 6 below:

$$\min \sum_{k=1}^{n} (a_L(k) - a_R(k))^2 \qquad (6)$$

Figure 10:
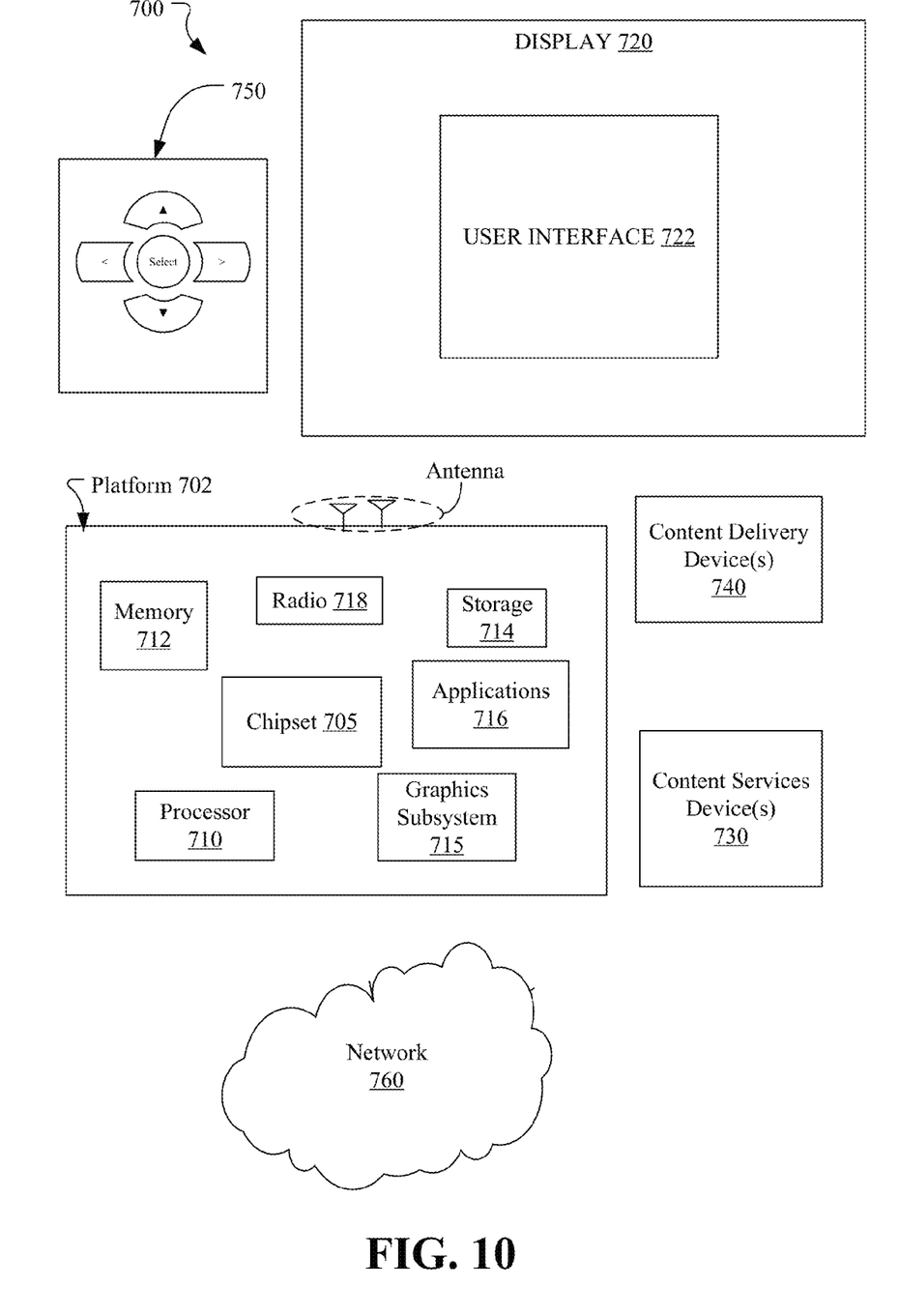
FIG. 10 is a block diagram of an example of a system having a navigation controller according to an embodiment.

FIG. 10 illustrates an embodiment of a system 700. In the exemplary embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In the exemplary embodiments, the system 700 comprises a platform 702 coupled to a display 720 that presents visual content. The platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In the exemplary embodiments, the platform 702 may comprise any combination of a chipset 705, processor 710, memory 712, storage 714, graphics subsystem 715, applications 716 and/or radio 718 (e.g., network controller). The chipset 705 may provide intercommunication among the processor 710, memory 712, storage 714, graphics subsystem 715, applications 716 and/or radio 718. For example, the chipset 705 may include a storage adapter (not depicted) capable of providing intercommunication with the storage 714.

The processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, the processor 710 may comprise dual-core processor(s), dual-core mobile processor(s), and so forth.

The memory 712 may be implemented as a volatile memory device such as, but not limited to, a Random Access Memory (RAM), Dynamic Random Access Memory (DRAM), or Static RAM (SRAM).

The storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

The graphics subsystem 715 may perform processing of images such as still or video for display. The graphics subsystem 715 may be a graphics processing unit (GPU) or a visual processing unit (VPU), for example. An analog or digital interface may be used to communicatively couple the graphics subsystem 715 and display 720. For example, the interface may be any of a High-Definition Multimedia Interface, DisplayPort, wireless HDMI, and/or wireless HD compliant techniques. The graphics subsystem 715 could be integrated into processor 710 or chipset 705. The graphics subsystem 715 could be a stand-alone card communicatively coupled to the chipset 705. In one example, the graphics subsystem 715 includes device plurality of cameras and the processor 710 is configured to automatically calibrate the plurality of cameras as described herein.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 718 may be a network controller including one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In the exemplary embodiments, the display 720 may comprise any television type monitor or display. The display 720 may comprise, for example, a computer display screen, touch screen display, video monitor, television-like device, and/or a television. The display 720 may be digital and/or analog. In embodiments, the display 720 may be a holographic display. Also, the display 720 may be a transparent surface that may receive a visual projection. Such projections may convey various forms of information, images, and/or objects. For example, such projections may be a visual overlay for a mobile augmented reality (MAR) application. Under the control of one or more software applications 716, the platform 702 may display user interface 722 on the display 720.

In the exemplary embodiments, content services device(s) 730 may be hosted by any national, international and/or independent service and thus accessible to the platform 702 via the Internet, for example. The content services device(s) 730 may be coupled to the platform 702 and/or to the display 720. The platform 702 and/or content services device(s) 730 may be coupled to a network 760 to communicate (e.g., send and/or receive) media information to and from network 760. The content delivery device(s) 740 also may be coupled to the platform 702 and/or to the display 720.

In the embodiments, the content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

The content services device(s) 730 receives content such as cable television programming including media information, digital information, and/or other content. Examples of content providers may include any cable or satellite television or radio or Internet content providers. The provided examples are not meant to limit embodiments.

In embodiments, the platform 702 may receive control signals from a navigation controller 750 having one or more navigation features. The navigation features of the controller 750 may be used to interact with the user interface 722, for example. In embodiments, the navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of the controller 750 may be echoed on a display (e.g., display 720) by movements of a pointer, cursor, focus ring, or other visual indicators displayed on the display. For example, under the control of software applications 716, the navigation features located on the navigation controller 750 may be mapped to virtual navigation features displayed on the user interface 722, for example. In embodiments, the controller 750 may not be a separate component but integrated into the platform 702 and/or the display 720. Embodiments, however, are not limited to the elements or in the context shown or described herein.

In the exemplary embodiments, drivers (not shown) may comprise technology to enable users to instantly turn on and off the platform 702 like a television with the touch of a button after initial boot-up, when enabled, for example. Program logic may allow the platform 702 to stream content to media adaptors or other content services device(s) 730 or content delivery device(s) 740 when the platform is turned "off." In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in the system 700 may be integrated. For example, the platform 702 and the content services device(s) 730 may be integrated, or the platform 702 and the content delivery device(s) 740 may be integrated, or the platform 702, the content services device(s) 730, and the content delivery device(s) 740 may be integrated, for example. In various embodiments, the platform 702 and the display 720 may be an integrated unit. The display 720 and content service device(s) 730 may be integrated, or the display 720 and the content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

As described above, the system 700 may be embodied in varying physical styles or form factors. FIG. 10 illustrates embodiments of a small form factor device 800 in which the system 700 may be embodied. In embodiments, for example, the device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some exemplary embodiments may be described with a mobile computing device implemented as a smart phone by way of example, it may be appreciated that other embodiments may be implemented using other wireless mobile computing devices as well. The exemplary embodiments are not limited in this context.

Figure 11:
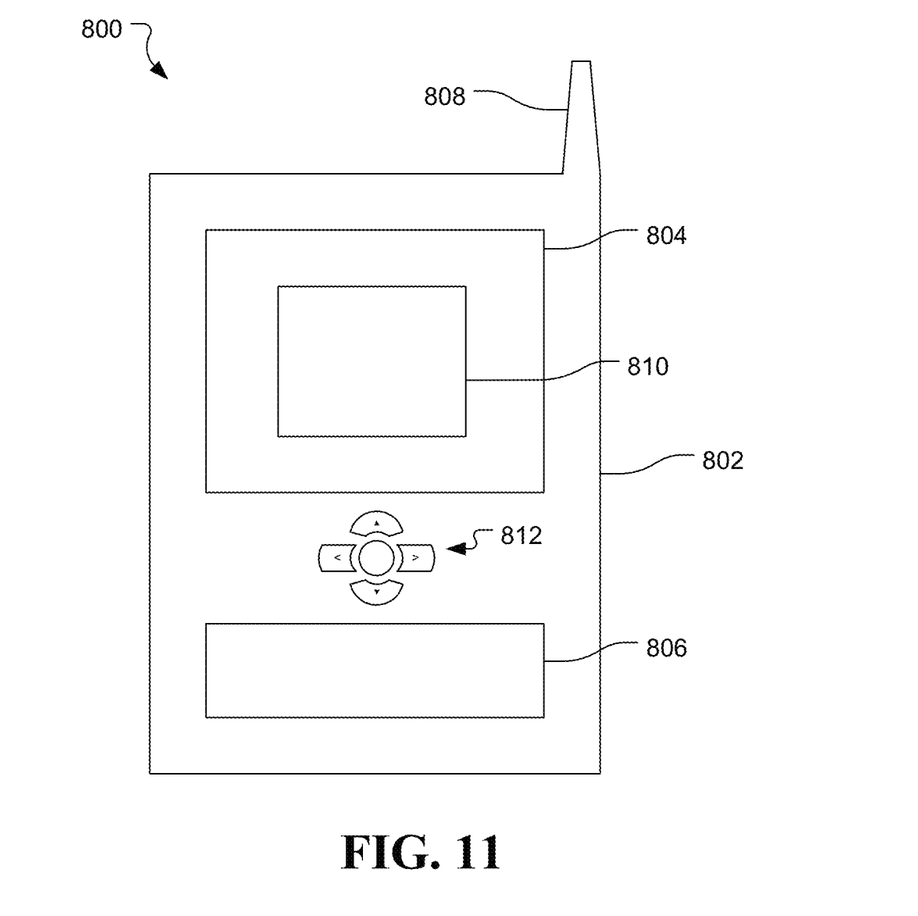
FIG. 11 is a block diagram of an example of a system having a small form factor according to an embodiment.

As shown in FIG. 11, the device 800 may comprise a housing 802, a display 804, an input/output (I/O) device 806, and an antenna 808. The device 800 also may comprise navigation features 812. The display 804 may comprise any suitable display unit for displaying information appropriate for a mobile computing device. The I/O device 806 may comprise any suitable I/O device for entering information into a mobile computing device. Examples for the I/O device 806 may include an alphanumeric keyboard, a numeric keypad, a touch pad, input keys, buttons, switches, rocker switches, microphones, speakers, voice recognition device and software, and so forth. Information also may be entered into the device 800 by way of microphone. Such information may be digitized by a voice recognition device. The embodiments are not limited in this context.

Additional Notes and Examples

Example 1 may include a camera-based assistance system comprising a plurality of cameras each comprising an electro-optical component to capture images, wherein the cameras are located in different areas on a vehicle hosting the camera-based driver-assistance system, a feature point analyzer to determine, for the plurality of cameras, a first constraint set based on a plurality of feature points in a ground plane proximate to the vehicle, a border analyzer to determine, for the plurality of cameras, a second constraint set based on one or more borders of the vehicle, a calibrator to conduct an automatic calibration of one or more of the plurality of cameras based on the first constraint set and the second constraint set, and a display to visually output a result of the automatic calibration.

Example 2 may include the system of Example 1, wherein the border analyzer includes an image, data interface to receive image data associated with the plurality of cameras, a frame analyzer to determine an optical flow based on a plurality of frames in the image data, and a border detector to identify the one or more borders based on the optical flow.

Example 3 may include the system of Example 1, further including a sensor interface to receive additional sensor data from one or more sensors on the vehicle, wherein the border analyzer is to determine the second constraint set based on the additional sensor data and the additional sensor data is to include one or more of velocity data, steering angle data, wheel information, and inertia data.

Example 4 may include the system of Example 1, wherein the feature point analyzer is to include an orientation estimator to estimate an orientation of each feature point relative to a coordinate system of the plurality of cameras, and a location estimator to estimate a location of each feature point relative to the coordinate system of the plurality of cameras.

Example 5 may include the system of Example 5, further including a feature point extractor to receive image data associated with the plurality of cameras, and detect the plurality of feature points based on the image data.

Example 6 may include the system of any one of Examples 1 to 5, wherein the calibrator is to estimate an orientation of one or more of the plurality of cameras to conduct the automatic calibration.

Example 7 may include a camera calibration apparatus comprising a feature point analyzer to determine, for the plurality of cameras, a first constraint set based on a plurality of feature points in a ground plane proximate to the vehicle, a border analyzer to determine, for the plurality of cameras, a second constraint set based on one or more borders of the vehicle, and a calibrator to conduct an automatic calibration one or more of the plurality of cameras based on the first constraint set and the second constraint set.

Example 8 may include the apparatus of Example 7, wherein the border analyzer includes an image data interface to receive image data associated with the plurality of cameras, a frame analyzer to determine an optical flow based on a plurality of frames in the image data, and a border detector to identify the one or more borders based on the optical flow.

Example 9 may include the apparatus of Example 7, further including a sensor interface to receive additional sensor data from one or more sensors on the vehicle, wherein the border analyzer is to determine the second constraint set based on the additional sensor data and the additional sensor data is to include one or more of velocity data, steering angle data, wheel information, and inertia data.

Example 10 may include the apparatus of Example 7, wherein the frame analyzer includes an orientation estimator to estimate an orientation of each feature point relative to a coordinate system of the plurality of cameras, and a location estimator to estimate a location of each feature point relative to the coordinate system of the plurality of cameras.

Example 11 may include the apparatus of Example 7, further including a feature point extractor to receive image data associated with the plurality of cameras, and detect the plurality of feature points based on the received image data.

Example 12 may include the apparatus of any one of Examples 7 to 11, wherein the calibrator is to estimate an orientation of one or more of the plurality of cameras to conduct the automatic calibration.

Example 13 may include a method of automatically calibrating a camera-based driver-assistance system comprising determining, for a plurality of cameras, a first constraint set based on a plurality of feature points in a ground plane proximate to a vehicle, determining, for the plurality of cameras, a second constraint set based on one or more borders of the vehicle, and conducting an automatic calibration of one or more of the plurality of cameras based on the first constraint set and the second constraint set.

Example 14 may the method of Example 13, wherein determining the second constraint set includes receiving image data associated with the plurality of cameras, determining an optical flow based on a plurality of frames in the image data, and identifying the one or more borders based on the optical flow.

Example 15 may include the method of Example 13, further including receiving additional sensor data from one or more sensors on the vehicle, wherein the second constraint set is determined based on the additional sensor data and the additional sensor data includes one or more of velocity data, steering angle data, wheel information, and inertia data.

Example 16 may include the method of Example 13, wherein determining the first constraint set includes estimating an orientation of each feature point relative to a coordinate system of the plurality of cameras, and estimating a location of each feature point relative to the coordinate system of the plurality of cameras.

Example 17 may include the method of Example 13, further including receiving image data associated with the plurality of cameras, and detecting the plurality of feature points based on the image data.

Example 18 may include the method of any one of Examples 13 to 17, wherein conducting the automatic calibration includes estimating an orientation of one or more of the plurality of cameras.

Example 19 may include at least one non-transitory computer readable storage medium, comprising a set of instructions which, when executed by a computing device causes the computing device to determine, for a plurality of cameras, a first constraint set based on a plurality of feature points in a ground plane proximate to a vehicle, determine, for the plurality of cameras, a second constraint set based on one or more borders of the vehicle, and conduct an automatic calibration of one or more of the plurality of cameras based on the first constraint set and the second constraint set.

Example 20 may include the at least one computer readable storage medium of Example 19, wherein the instructions, when executed, cause the computing device to receive image data associated with the plurality of cameras, determine an optical flow based on a plurality of frames in the image data, identify the one or more borders based on the optical flow to determine the second constraint set.

Example 21 may include the at least one computer readable storage medium of Example 19, wherein the instructions, when executed, cause the computing device to receive additional sensor data from one or more sensors on the vehicle, wherein the second constraint set is determined based on the additional sensor data and the additional sensor data includes one or more of velocity data, steering angle data, wheel information, inertia data.

Example 22 may include the at least one computer readable storage medium of Example 19, wherein the instructions, when executed, cause the computing device to estimate an orientation of each feature point relative to a coordinate system of the plurality of cameras, and estimate a location of each feature point relative to the coordinate system of the plurality of cameras to determine the first constraint set.

Example 23 may include the at least one computer readable storage medium of Example 19, wherein the instructions, when executed, cause the computing device to receive image data associated with the plurality of cameras, and detect the plurality of feature points based on the image data.

Example 24 may include the at least one computer readable storage medium of any one of Examples 19 to 23, wherein the instructions, when executed, cause the computing device to estimate an orientation of one or more of the plurality of cameras to conduct the automatic calibration.

Example 25 may include a camera calibration apparatus comprising means for determining, for a plurality of cameras, a first constraint set based on a plurality of feature points in a ground plane proximate to a vehicle, means for determining, for the plurality of cameras, a second constraint set based on one or more borders of the vehicle, and means for conducting an automatic calibration of one or more of the plurality of cameras based on the first constraint set and the second constraint set.

Example 26 may include the apparatus of Example 25, wherein the means for determining the second constraint set includes means for receiving image data associated with the plurality of cameras, means for determining an optical flow based on a plurality of frames in the image data, and means for identifying the one or more borders based on the optical flow.

Example 27 may include the apparatus of Example 25, further including means for receiving additional sensor data from one or more sensors on the vehicle, wherein the second constraint set is to be determined based on the additional sensor data and the additional sensor data is to include one or more of velocity data, steering angle data, wheel information, and inertia data.

Example 28 may include the apparatus of Example 25, wherein the means for determining the first constraint set includes means for estimating an orientation of each feature point relative to a coordinate system of the plurality of cameras, and means for estimating a location of each feature point relative to the coordinate system of the plurality of cameras.

Example 29 may include the apparatus of Example 25, further including means for receiving image data associated with the plurality of cameras, and means for detecting the plurality of feature points based on the image data.

Example 30 may include the apparatus of any one of Examples 25 to 29, wherein the means for conducting the automatic calibration includes means for estimating an orientation of one or more of the plurality of cameras.

Techniques described herein may therefore provide a methodology of automatically estimating the orientation of camera systems relative to a vehicle. The methodology may be used in advanced driver assistance systems and in-vehicle infotainment systems. Infotainment systems are generally information-based and entertainment-based media content or programming systems which include entertainment content or hardware and/or software products and systems which are built into, or can be added to vehicles in order to enhance driver and/or passenger comfort and convenience. The techniques may use image recognition software to process images captured by cameras positioned on vehicles. The techniques may also provide the automatic calibration of cameras positioned on vehicles without the need for external resources such as markers or calibration patterns, and without the need for servicing by the manufacturer. Techniques may automatically calibrate all rotation parameters. Feature points nearby the vehicle may be identified and locations and orientations of the feature points relative to the vehicle may be estimated to determine a first constraint set for extrinsic camera parameters. The technique may determine a second constraint set by detecting the borders of the vehicle and matching the detected borders to known geometrics of the vehicle itself. The technique of using the additional second constraint set allows all necessary extrinsic parameters to be determined. The two-dimensional motion of a vehicle may be estimated, and thus the camera parameters may be deduced. The techniques use only the motion of the vehicle to estimate the orientation of the camera system relative to the vehicle. Almost any environment may be used if the ground plane is flat. The techniques allow the calibration parameters to be obtained without effort by the driver of the vehicle.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments of this have been described in connection with particular examples thereof, the true scope of the embodiments should not be so limited since other modifications will become apparent to the skilled practitioner upon a study of the drawings, specification, and following claims.

We claim:

1. A camera-based driver-assistance system comprising:
 a plurality of cameras each comprising an electro-optical component to capture images, wherein the cameras are located in different areas on a vehicle hosting the camera-based driver-assistance system;
 a feature point analyzer to determine, for the plurality of cameras, a first constraint set based on an estimated location of a plurality of feature points and an estimated orientation of the plurality of feature points in a ground plane proximate to the vehicle;
 a border analyzer to determine, for the plurality of cameras, a second constraint set based on one or more borders of the vehicle;
 a calibrator to conduct an automatic calibration of one or more of the plurality of cameras based on the first constraint set and the second constraint set; and
 a display to visually output a result of the automatic calibration.

2. The system of claim 1, wherein the border analyzer includes:
 an image data interface to receive image data associated with the plurality of cameras;
 a frame analyzer to determine an optical flow based on a plurality of frames in the image data;
 a border detector to identify the one or more borders based on the optical flow.

3. The system of claim 1, further including a sensor interface to receive additional sensor data from one or more sensors on the vehicle, wherein the border analyzer is to determine the second constraint set based on the additional sensor data and the additional sensor data is to include one or more of velocity data, steering angle data, wheel information, and inertia data.

4. The system of claim 1, wherein the feature point analyzer is to include:
 an orientation estimator to estimate the orientation of each feature point relative to a coordinate system of the plurality of cameras; and
 a location estimator to estimate the location of each feature point relative to the coordinate system of the plurality of cameras.

5. The system of claim 1, further including a feature point extractor to receive image data associated with the plurality of cameras, and detect the plurality of feature points based on the image data.

6. The system of claim 1, wherein the calibrator is to estimate an orientation of one or more of the plurality of cameras to conduct the automatic calibration.

7. The system of claim 1, wherein the feature points are to be non-stationary points.

8. A method comprising:
 determining, for a plurality of cameras, a first constraint set based on an estimated location of a plurality of feature points and an estimated orientation of the plurality of feature points in a ground plane proximate to a vehicle;

determining, for the plurality of cameras, a second constraint set based on one or more borders of the vehicle; and conducting an automatic calibration of one or more of the plurality of cameras based on the first constraint set and the second constraint set.

9. The method of claim 8, wherein determining the second constraint set includes:

receiving image data associated with the plurality of cameras;

determining an optical flow based on a plurality of frames in the image data; and identifying the one or more borders based on the optical flow.

10. The method of claim 8, further including receiving additional sensor data from one or more sensors on the vehicle, wherein the second constraint set is determined based on the additional sensor data and the additional sensor data includes one or more of velocity data, steering angle data, wheel information, and inertia data.

11. The method of claim 8, wherein determining the first constraint set includes:

estimating the orientation of each feature point relative to a coordinate system of the plurality of cameras; and estimating the location of each feature point relative to the coordinate system of the plurality of cameras.

12. The method of claim 8, further including:

receiving image data associated with the plurality of cameras; and detecting the plurality of feature points based on the image data.

13. The method of claim 8, wherein conducting the automatic calibration includes estimating an orientation of one or more of the plurality of cameras.

14. The method of claim 8, wherein the feature points are non-stationary points.

15. At least one non-transitory computer readable storage medium, comprising a set of instructions which, when executed by a computing device causes the computing device to:

determine, for a plurality of cameras, a first constraint set based on an estimated location of a plurality of feature points and an estimated orientation of the plurality of feature points in a ground plane proximate to a vehicle;

determine, for the plurality of cameras, a second constraint set based on one or more borders of the vehicle; and conduct an automatic calibration of one or more of the plurality of cameras based on the first constraint set and the second constraint set.

16. The at least one non-transitory computer readable storage medium of claim 15, wherein the instructions, when executed, cause the computing device to:

receive image data associated with the plurality of cameras;

determine an optical flow based on a plurality of frames in the image data;

identify the one or more borders based on the optical flow to determine the second constraint set.

17. The at least one non-transitory computer readable storage medium of claim 15, wherein the instructions, when executed, cause the computing device to receive additional sensor data from one or more sensors on the vehicle, wherein the second constraint set is determined based on the additional sensor data and the additional sensor data includes one or more of velocity data, steering angle data, wheel information, and inertia data.

18. The at least one non-transitory computer readable storage medium of claim 15, wherein the instructions, when executed, cause the computing device to:

estimate the orientation of each feature point relative to a coordinate system of the plurality of cameras; and estimate the location of each feature point relative to the coordinate system of the plurality of cameras to determine the first constraint set.

19. The at least one non-transitory computer readable storage medium of claim 15, wherein the instructions, when executed, cause the computing device to:

receive image data associated with the plurality of cameras, and detect the plurality of feature points based on the image data.

20. The at least one non-transitory computer readable storage medium of claim 15, wherein the instructions, when executed, cause the computing device to estimate an orientation of one or more of the plurality of cameras to conduct the automatic calibration.

21. The at least one non-transitory computer readable storage medium of claim 15, wherein the feature points are to be non-stationary points.

* * * * *